June 17, 1930.  J. F. BOORAEM ET AL  1,763,920
FURNACE STRUCTURE
Filed May 12, 1927  7 Sheets-Sheet 1

INVENTORS
Edward J. Hatton,
J. F. Booraem
By C. P. Goepel
ATTORNEY

June 17, 1930. J. F. BOORAEM ET AL 1,763,920
FURNACE STRUCTURE
Filed May 12, 1927 7 Sheets-Sheet 2

INVENTORS
Edward J. Hatton,
J. F. Booraem
By C. P. Goepel
ATTORNEY

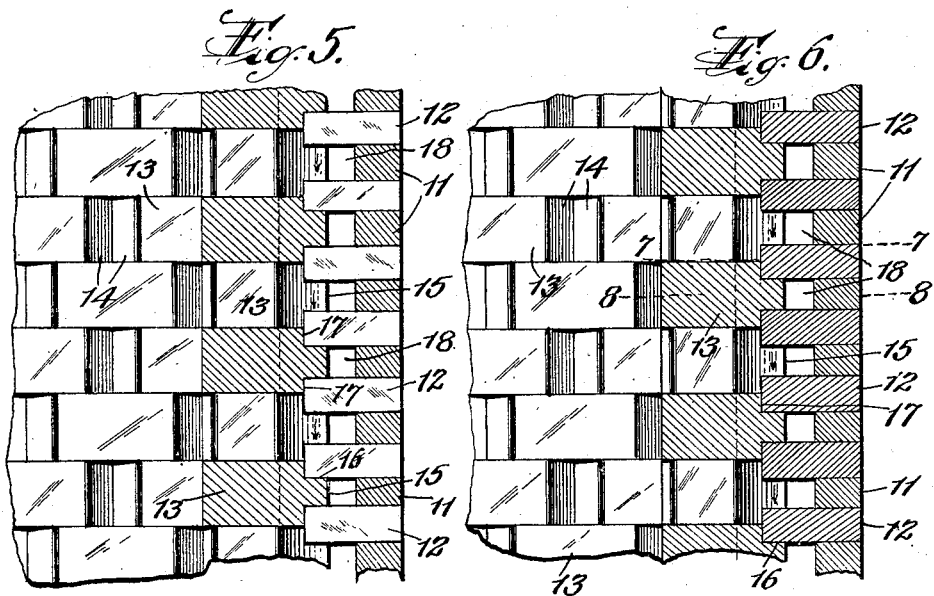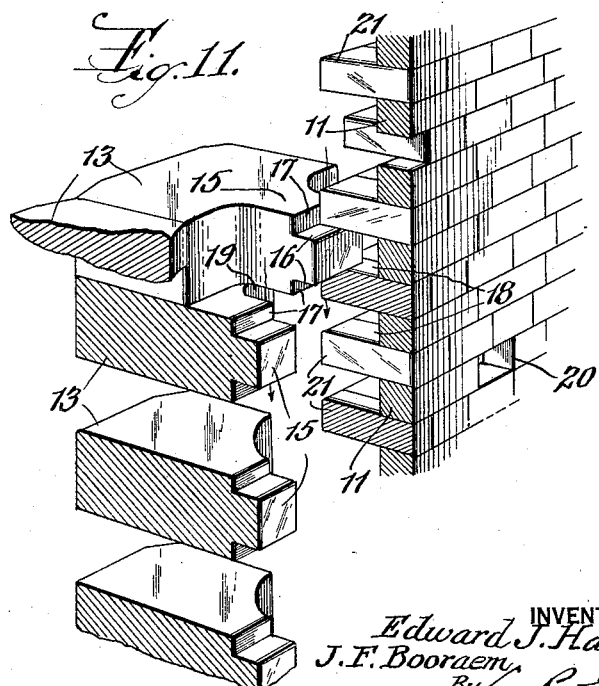

June 17, 1930. J. F. BOORAEM ET AL 1,763,920
FURNACE STRUCTURE
Filed May 12, 1927 7 Sheets-Sheet 4
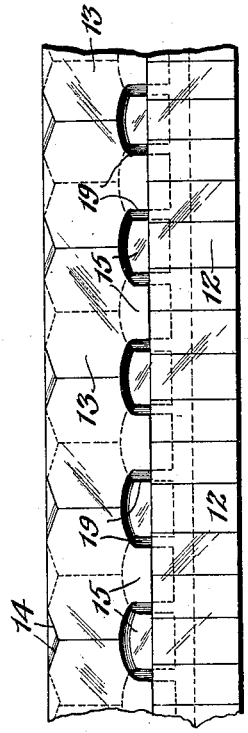
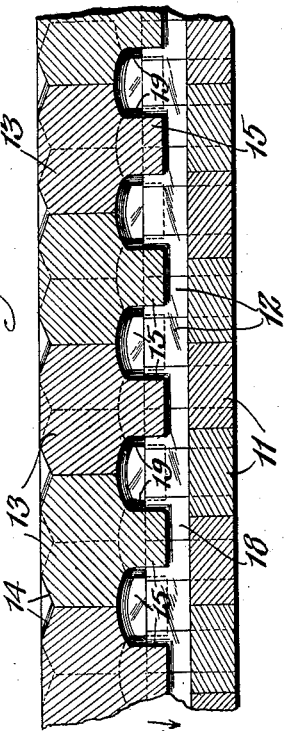
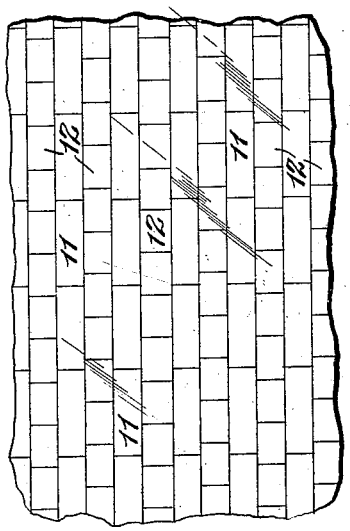
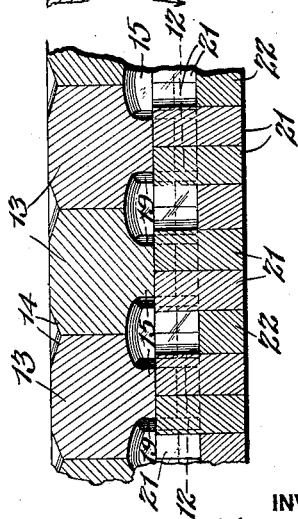
INVENTORS
Edward J. Hatton,
J. F. Booraem
By C. P. Goepel
ATTORNEY June 17, 1930. J. F. BOORAEM ET AL 1,763,920
FURNACE STRUCTURE
Filed May 12, 1927    7 Sheets-Sheet 5
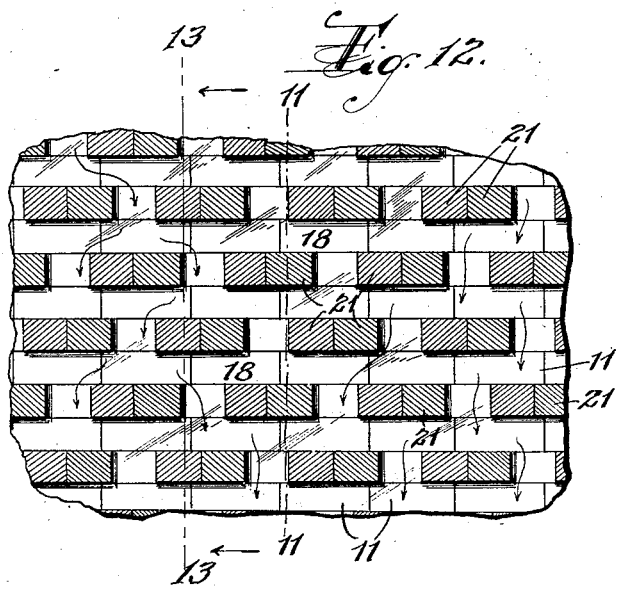
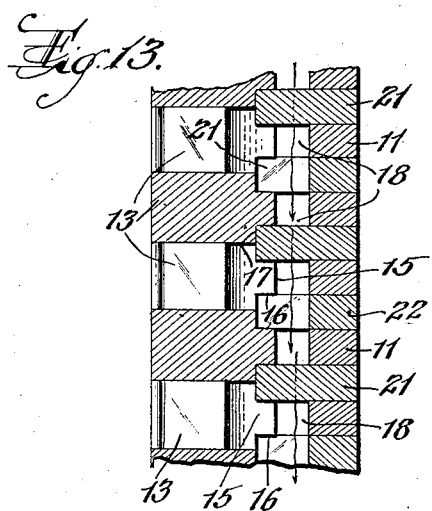
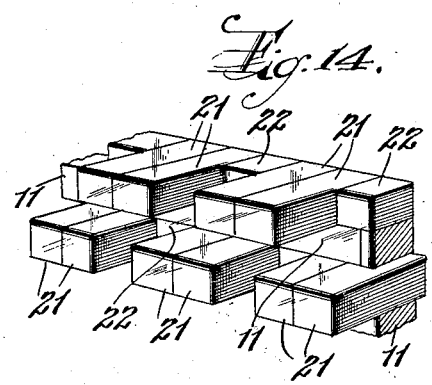
INVENTORS
Edward J. Hatton,
J. F. Booraem
By C. P. Goepel
ATTORNEY

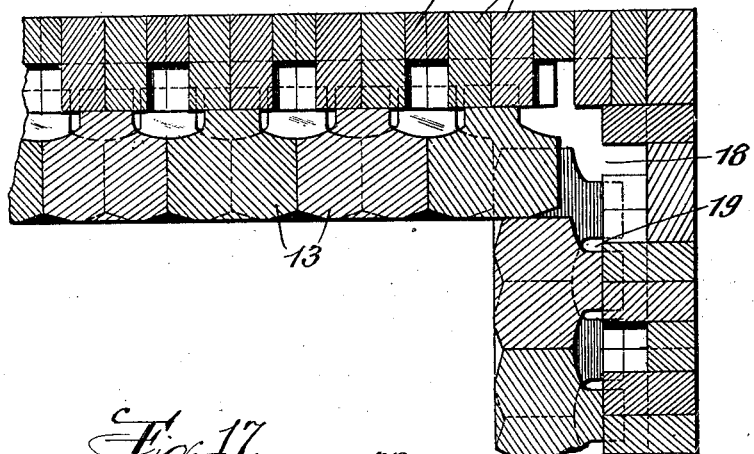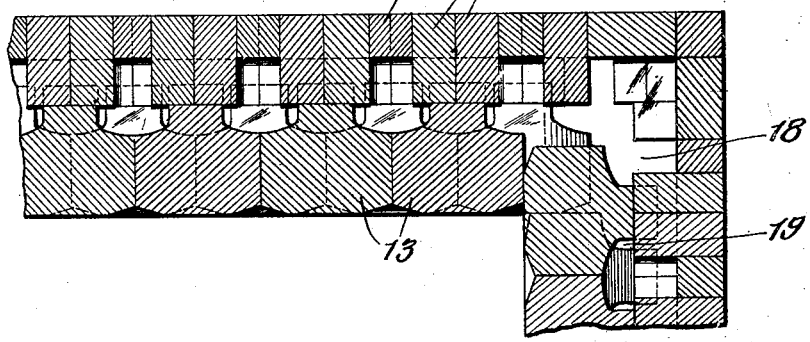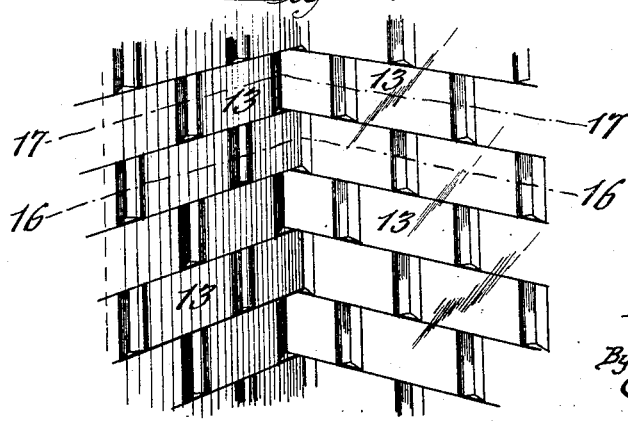

Patented June 17, 1930

1,763,920

UNITED STATES PATENT OFFICE

JOHN FRANCIS BOORAEM AND EDWARD J. HATTON, OF GREENWICH, CONNECTICUT

FURNACE STRUCTURE

Application filed May 12, 1927. Serial No. 190,946.

This invention relates to furnace structures, and has for its primary object to provide improved means for supplying preheated air of high oxygen content for admixture with unignited fuel in order to facilitate and obtain more perfect combustion of the fuel.

More particularly, our invention involves certain novel features in the wall structure of the furnace whereby the wall is provided with a plurality of parallel communicating air passages into which air is drawn by induction from the exterior of the furnace and in its course of flow through said passages absorbs heat by radiation through the inner portion of the furnace wall, such preheated air being finally drawn from said passages and delivered through the front wall of the furnace into the combustion chamber.

In one practical embodiment of our invention, we propose to construct the furnace with an outer wall consisting of alternating courses of stretcher and header bricks of the form commonly used in building constructions, and an inner lining wall consisting of courses of refractory fire brick of special form, and said refractory brick being so arranged and co-related with the stretcher and header brick courses in the outer wall as to produce between said walls circuitous or labyrinthic passages into which air is drawn through suitable apertures in the outer wall and whereby the air will have ample opportunity for the absorption of heat radiated through the refractory brick.

The improved furnace structure is especially designed for use in connection with pulverized fuel burning furnaces, and the air preheating passages through the furnace walls preferably communicate at their egress ends with a common chamber extending over the front side of the furnace and from which the preheated air is drawn by induction into the delivery nozzles through which the pulverized fuel is discharged under air pressure into the furnace combustion chamber.

With the above and other objects in view, the invention consists in the improved furnace structure and in the construction and arrangement of the several parts thereof as will be hereinafter more fully described, illustrated in the accompanying drawings and subsequently incorporated in the subjoined claims.

In the drawings, wherein we have disclosed several simple and practical embodiments of our present improvements, and in which similar reference characters designate corresponding parts throughout the several views,—

Fig. 5 is a detail vertical sectional view taken on the line 5—5 of Fig. 1;

Fig. 6 is a similar sectional view taken on the line 6—6 of Fig. 1;

Fig. 7 is a horizontal sectional view taken on the line 7—7 of Fig. 6;

Fig. 8 is a similar horizontal section taken on the line 8—8 of Fig. 6;

Fig. 9 is a fragmentary outer side elevation of one of the furnace walls showing the relative arrangement of the joints of the stretcher and header brick courses in a modified form of the invention;

Fig. 10 is a fragmentary horizontal sectional view of the modified construction;

Fig. 11 is a vertical sectional perspective view on the line 11—11 of Fig. 12;

Fig. 12 is a horizontal sectional view taken on the line 12—12 of Fig. 10;

Fig. 13 is a vertical section taken on the line 13—13 of Fig. 12;

Fig. 14 is a detail perspective view illustrating the arrangement of the header and setretcher brick courses in the modified construction;

Fig. 15 is an internal fragmentary perspective view showing the meeting ends of the angularly related lining walls of the furnace at one corner thereof;

Fig. 16 is a horizontal sectional view taken on the line 16—16 of Fig. 15;

Fig. 17 is a similar sectional view taken on the line 17—17 of Fig. 15;

Fig. 18 is a fragmentary perspective view similar to Fig. 15 showing a special form of the corner blocks for the lining walls;

Fig. 19 is a horizontal sectional view taken on the line 19—19 of Fig. 18, and

Fig. 20 is a similar sectional view taken on the line 20—20 of Fig. 18.

Figure 1:
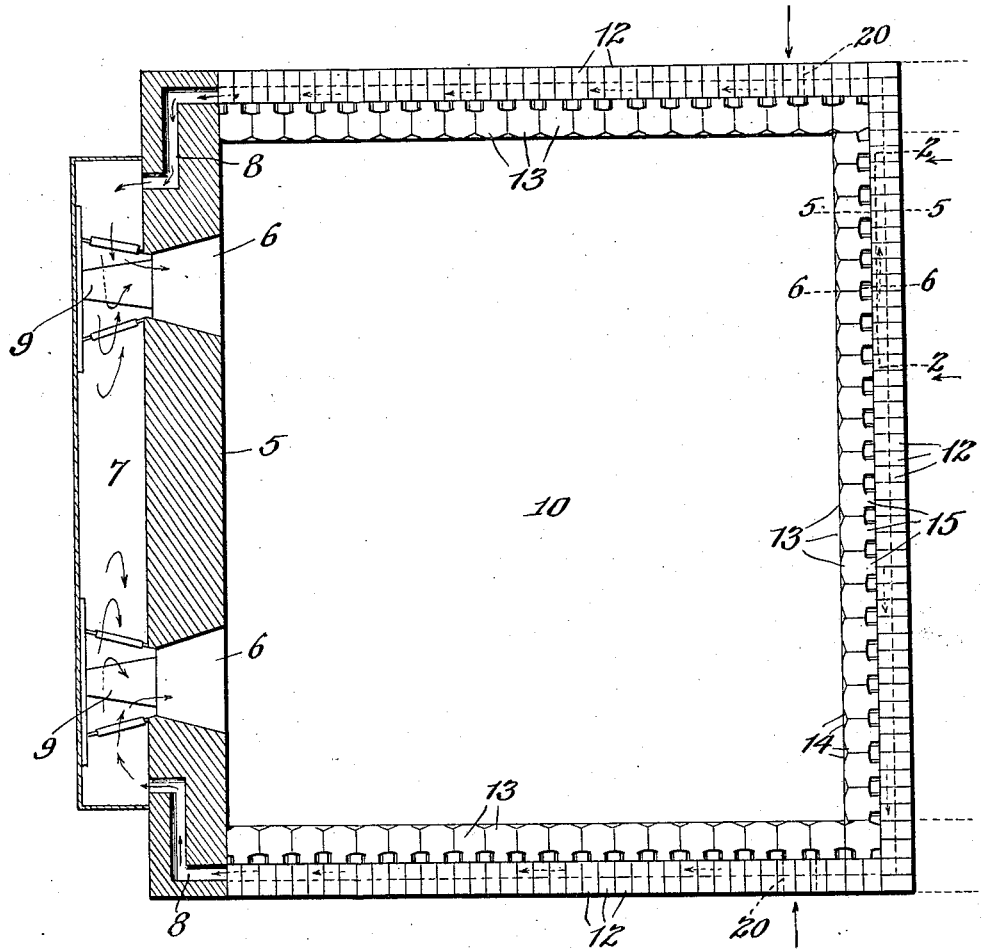
Figure 1 is a plan view of a furnace embodying our invention, the top thereof being omitted and the front furnace wall being shown in section.
Figure 2:
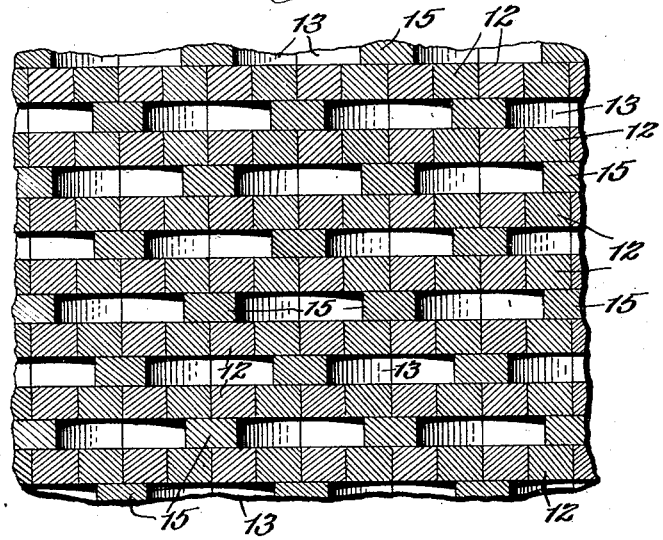
Fig. 2 is a fragmentary vertical sectional view through one of the furnace walls taken substantially on the line 2—2 of Fig. 1.
Figure 3:
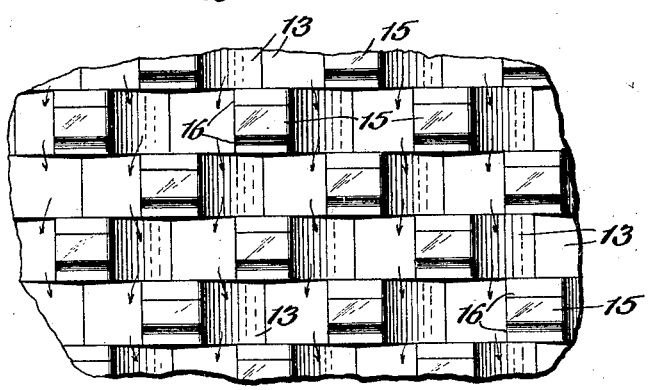
Fig. 3 is a fragmentary outer side elevation of one of the inner lining walls of the furnace.
Figure 4:
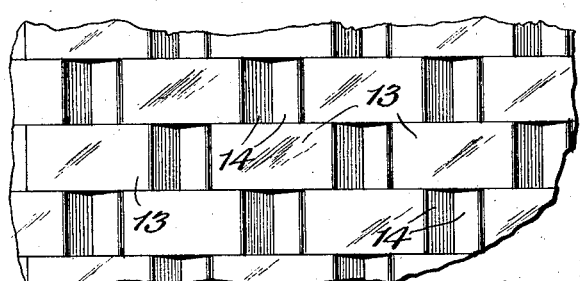
Fig. 4 is a similar interior elevation of said lining wall.

For the purpose of illustrating the present invention, in Fig. 1 of the drawings, we have shown more or less diagrammatically, a typical type of furnace as equipped for the burning of pulverized fuel. To this end, we have shown the front wall 5 of the furnace which may be of solid masonry construction as provided with suitably spaced inwardly flaring fuel inlet openings 6 therethrough. Upon the outer face of this wall, there is provided an air receiving chamber 7 and passages 8 formed through the opposite ends of the front wall 5 open at one of their ends into this chamber. The nozzles indicated at 9 may be of any conventional type and through the same pulverized fuel is ejected or discharged under air pressure through the inlet opening 6 and into the combustion chamber 10 of the furnace. These nozzles 9 are provided with suitable ports or openings through which preheated air is drawn from the chamber 7 by the induction effect of the ejector air for the pulverized fuel. For the purpose of preheating this air supplied to the chamber 7, the side and rear walls of the furnace are constructed in the following manner.

An outer furnace wall proper is built up of alternate courses of stretcher brick 11 and header brick 12. In the construction shown in Figs. 1 to 8 inclusive, the joints between the brick in the several stretcher and header courses are respectively in vertical alignment, the joints between the stretcher brick being staggered or out of alignment with the joints between the header brick. These brick may be of the usual dimensions used for building purposes, wherein the length of the brick is approximately equal to twice its width. Therefore, as shown in the drawings, since the ends of the bricks in the header courses are disposed in the same plane as the outer faces of the brick in the stretcher courses, it will be understood that the header brick thus project inwardly beyond the inner faces of the stretcher brick, such projecting portions of the header bricks in adjacent header courses being spaced from each other.

In conjunction with this outer furnace wall, an inner or lining wall is provided, the latter wall being built up of courses of especially constructed fire block of refractory material as generally indicated at 13. As herein shown, each of these refractory blocks has a maximum width approximately equal to the combined width of three of the header bricks 12 and the faces of these inner lining wall blocks which are opposed to the furnace combustion chamber have their opposite ends beveled in reverse directions as indicated at 14 so that the said beveled faces of adjacent blocks provide heat retaining pockets.

The outer end of each refractory lining block 13 has a reduced central extension 15, the upper and lower faces of said extension at the end thereof being rabbeted or recessed as indicated at 16 to receive the inner ends of the header course brick 12. These recesses present vertical shoulders 17 against which the ends of the header brick abut, thereby spacing the end faces of the projections 15 from the inner faces of the stretcher course bricks 11 in the outer wall whereby the horizontally extending passages 18 are formed in line with each course of stretcher brick.

From reference to Figs. 7 and 8 of the drawings, it will be noted that the refractory blocks 13 in the vertically adjacent courses are staggered with relation to each other so that the joints between the blocks in one course are centrally disposed with relation to the joints in the adjacent course. As the reduced extensions 15 of these refractory blocks are somewhat less than one-half of the width of the block, it will therefore, be apparent that the side faces of these extensions in the adjacent refractory block courses are spaced laterally from each other, thus affording vertical passages as indicated at 19 which connect the several horizontal passages 18 with each other. This provides a ramified or labyrinthic arrangement of air passages through which the air flows in a more or less circuitous course and increases the surface area of the refractory blocks 13 with which the air may come into contact and thus absorb the heat radiated through said blocks from the combustion chamber of the furnace. It will be understood that the passages 18 in the several furnace walls are in communication with each other at the meeting ends of said walls, and these passages in the side walls of the furnace are in line with the passages 8 in the ends of the front wall 5 of the furnace as indicated in Fig. 1 of the drawings. Thus, there may be a continuous flow of the air through the furnace walls to the chamber 7.

At desired intervals in the side and rear walls of the furnace, a space may be left between adjacent bricks in the stretcher or header courses to thereby provide suitable air inlets indicated at 20 communicating with the outer atmosphere and through which the cold air is admitted to the passages 18. Of course, if desired, a suitable screen may be provided over the inlet ends of the openings 20 so as to prevent foreign materials being drawn through said openings and collecting in the air passages. It will be evident that as this cold air travels vertically and horizontally between the outer wall and the inner lining wall of the furnace and in substantially continuous contact with the refractory lining blocks 13, it will become highly heated by the radiation of heat through said lining blocks. This preheated air is drawn by the comparatively cold ejector air into the nozzles 9 and is ejected with the fuel into the combustion chamber. By the preheating of this air, the ejector air is also heated and the combined oxygen content of the ejector air and the preheated air in association with the pulverized fuel, greatly aids in securing the practically complete combustion of the fuel. Thus, the heat of the fuel consumed instead of being dissipated through the furnace wall structure, is advantageously utilized whereby better combustion of the fuel is obtained so that the desired high temperatures may be maintained within the combustion chamber with a reduced consumption of fuel.

In Figs. 9 to 14 inclusive of the drawings, we have illustrated a slightly modified construction wherein the fire blocks 13 constituting the inner lining wall of the furnace are of the same construction and arranged in the same manner as above described, and in which the brick in the header courses 12 of the outer wall are differently arranged so as to provide for a freer vertical flow of the air between the horizontal passages 18 and thus permitting of a more rapid circulation of the air between the inner and outer wall structures. To this end, as clearly shown in Figs. 10, 12 and 14 of the drawings, full length header course bricks indicated at 21 are arranged in spaced pairs and are adapted to engage at their inner ends in the rabbets or recesses 16 of the refractory lining blocks 13 and between these spaced pairs of header bricks the half bricks 22 are arranged, the inner ends of said half bricks being disposed in the same plane as the inner faces of the stretcher course bricks. As will be seen from reference to Fig. 9 of the drawings, the joints between the bricks 21 and 22 in the alternate courses of header bricks are staggered or out of alignment with each other vertically of the wall and are also out of alignment with the joints between the interposed stretcher course bricks. From reference to Fig. 10 of the drawings, it will be seen that the half bricks 22 in the header courses are in line with the recesses or spaced between the reduced outwardly projecting parts 15 of the refractory liner blocks 13. Thus, it will be noted from reference to Fig. 12, the air may freely flow vertically from one horizontal passage or channel 18 to an adjacent passage through the spaces between the projections 15 of the liner blocks and through the open spaces which are thus provided between the spaced pairs of header bricks 21 in the outer wall. This arrangement also provides for greater opportunity of the moving air currents to contact with the surfaces of the refractory blocks 13 and absorb the heat radiated therefrom. Of course it will be understood that the transverse dimension or thickness of the refractory blocks 13 may be varied in accordance with the heat absorbing and radiating capacity of the particular refractory material from which these blocks are produced and as may be required in accordance with the predetermined temperature of the preheated air as may be found to produce the best results in securing complete combustion of the particular fuel employed.

In Figs. 15, 16 and 17, we have shown in detail the arrangement of the lining blocks at the corners of the furnace structure so as to provide for the uninterrupted continuity of the passages 18 in the angularly related walls of the furnace. It will, however, be observed that when these lining blocks 13 are all of uniform shape and dimensions, the blocks in the courses of the respective walls being offset or staggered in relation to each other provide a broken vertical corner joint between the lining walls. Soot and dirt will collect in these corner joints which it is difficult to remove, and it is also more or less difficult to tightly seal these corner joints, in which case, air will escape from the passages 18.

In Figs. 18 to 20 of the drawings, we have shown a special form of the corner blocks for the lining wall whereby the above difficulty may be overcome. As shown, these corner blocks 13' are of L-shaped form in horizontal cross section, each block having a long arm 13$^a$ and a relatively short arm 13$^b$, each of which is formed with one of the reduced extensions 15', corresponding in structure with the extensions 15 of the other lining blocks 13 and adapted to cooperate with the bricks of the outer wall to form the communicating passages 18 in the manner above explained. These L-shaped corner blocks in the vertically adjacent courses of the lining wall are also arranged in offset or staggered relation so that in one course, the longer arm 13$^a$ of the corner block will extend in the plane of one side of the lining wall while in the adjacent course, the longer arm of the corner block extends in the plane of the other angularly related lining wall of the furnace.

The inner faces of these corner blocks opposed to the combustion chamber of the furnace, at the juncture of the angularly extending arms thereof are rounded or concave as shown at 13° so as to provide a smooth uninterrupted surface at the corners of the furnace, thus obviating any possibility of the lodgment of soot or dirt in the furnace corners and also insuring an air tight seal of the air passages at the corners of the furnace.

From the foregoing description, it will be seen that we have devised a relatively simple furnace wall structure whereby preheated air will be automatically supplied by the induction effect of the fuel ejecting air whereby the combined oxygen content of the air currents under the influence of heat immediately expands and intimately associates with the fuel particles at the point of ignition of the pulverized fuel at the inner face of the front wall of the furnace. In this manner, almost perfect combustion will be assured and the deposit of unconsumed fuel in the form of slag in the bottom of the combustion chamber will be substantially eliminated.

It will of course, be apparent that the essential features of our invention as herein described may be advantageously applied to numerous different types of furnaces employed for different purposes. Likewise, certain structural changes might be adopted in the refractory blocks constituting the inner lining wall, and the relative arrangement of these blocks and of the bricks in the outer wall might also be varied to meet conditions peculiar to the particular type of furnace. Accordingly, it is to be understood that in practice, we reserve the privilege of incorporating the essential features of the present disclosure in various other alternative structures as may be fairly considered within the spirit and scope of the appended claims.

We claim:

1. In a furnace, an outer wall consisting of alternating courses of stretcher brick having their longer dimension parallel with the wall, and header brick having their longer dimension extending transversely of the wall, an inner lining for the outer wall consisting of courses of refractory blocks, the joints between the blocks in one course being staggered with relation to the joints of the blocks of adjacent courses, and each of said blocks having a reduced outwardly projecting portion spaced from the stretcher brick in the outer wall and engaged by the inner ends of adjacent header brick above and below the stretcher brick to thereby provide a plurality of longitudinally extending air passages, said passages at one of their ends opening through the outer wall to the external atmosphere, and means affording communication between the other ends of said passages and the combustion chamber of the furnace.

2. In a furnace, an outer wall consisting of alternating courses of stretcher brick having their longer dimension parallel with the wall, and header brick having their longer dimension extending transversely of the wall, an inner lining for the outer wall consisting of courses of refractory blocks, the joints between the blocks in one course being staggered with relation to the joints of the blocks of adjacent courses, and each of said blocks having a reduced outwardly projecting portion spaced from the stretcher brick in the outer wall and engaged by the inner ends of adjacent header brick above and below the stretcher brick to thereby provide a plurality of longitudinally extending air passages, said projections of the liner blocks in adjacent superposed courses being laterally spaced apart and providing vertical passages connecting said horizontal passages with each other, said horizontal passages at one of their ends opening through the outer wall to the external atmosphere, and means affording communication between the other ends of said passages and the combustion chamber of the furnace.

3. In a furnace, a wall structure comprising outer alternating courses of standard stretcher and header bricks, the stretcher bricks having their longer dimensions parallel with the wall and the longer dimensions of the header bricks extending transversely of the wall, an inner lining consisting of superposed courses of refractory blocks each provided at one end with oppositely directed vertical shoulders against which the inner ends of the header bricks abut thereby spacing the end faces of said refractory blocks from the stretcher course brick and in conjunction therewith forming a plurality of horizontally extending air passages in communication with the external atmosphere, and means affording communication between said passages and the combustion chamber of the furnace.

4. In a furnace, a wall structure consisting of outer alternating courses of standard stretcher and header bricks, the stretcher bricks having their longer dimensions parallel with the wall and the longer dimensions of the header bricks extending transversely of the wall, an inner lining for the outer wall structure consisting of superposed courses of refractory blocks, each of said blocks being centrally provided with a reduced extension at its outer end and the blocks in adjacent courses being arranged in staggered relation to laterally space the block extensions of one course from the extensions of the adjacent courses of blocks, and said reduced extensions of the blocks being provided at the upper and lower sides thereof with vertically disposed shoulders against which the inner ends of certain of the bricks in adjacent header courses abut whereby the end faces of said extensions are spaced from the intervening stretcher course bricks to thereby form spaced horizontally extending air passages in communication with each other vertically of the wall structure between the laterally spaced extensions of the adjacent courses of refractory blocks, and the outer wall having openings therethrough for supplying air to said passages, and means affording communication between said passages and the combustion chamber of the furnace.

5. In a furnace, a wall structure consisting of superposed alternating courses of stretcher and header bricks and a lining for the wall structure composed of superposed courses of heat radiating refractory blocks, each of said blocks having a reduced projection on one end provided with abutment shoulders, and the bricks in each header course being arranged in spaced pairs of full length bricks and an interposed half length brick, said half and full length header bricks being arranged in staggered relation to each other vertically of the wall and said refractory lining blocks in adjacent courses being arranged with said projections in staggered relation to each other, and the spaced pairs of full length header brick engaged with said abutments and spacing the ends of said projections from the stretcher course bricks to thereby provide a plurality of horizontally extending passages, and said half length header bricks permitting of unobstructed vertical communication betweeen the adjacent passages, said passages being in communication with the external atmosphere through the outer wall, and means affording communication between said passages and the combustion chamber of the furnace.

In testimony that we claim the foregoing as our invention, we have signed our names hereto.

JOHN FRANCIS BOORAEM.
EDWARD J. HATTON.